March 29, 1955  R. G. OLSON  2,704,882
METHOD OF MAKING TOOTHED DEVICES
Filed Dec. 19, 1949  2 Sheets-Sheet 1
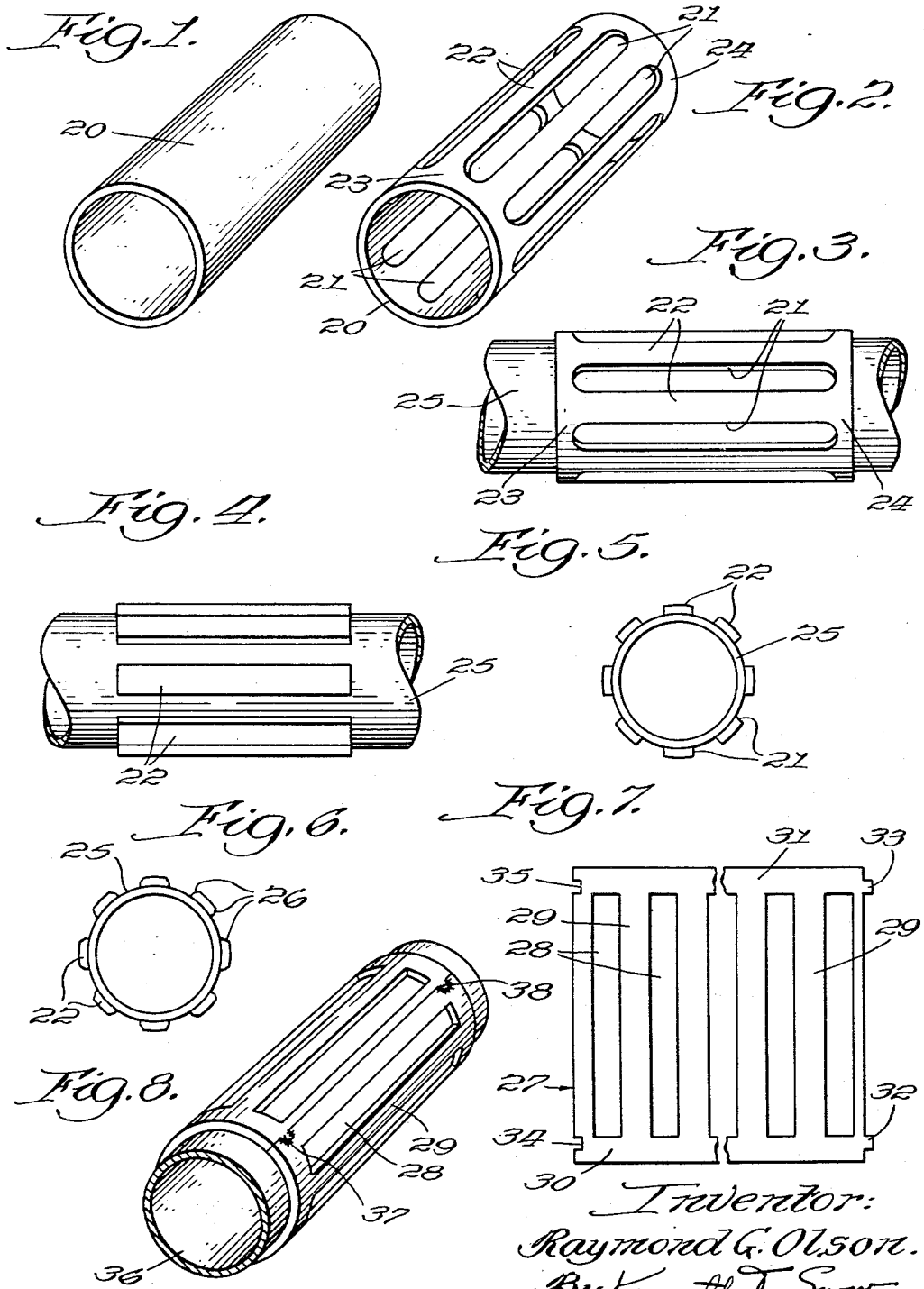
Inventor:
Raymond G. Olson.
By Kenneth T. Snow
Atty.

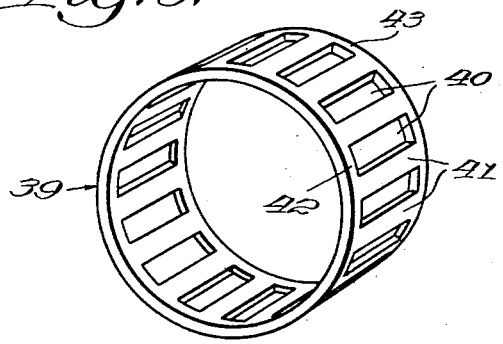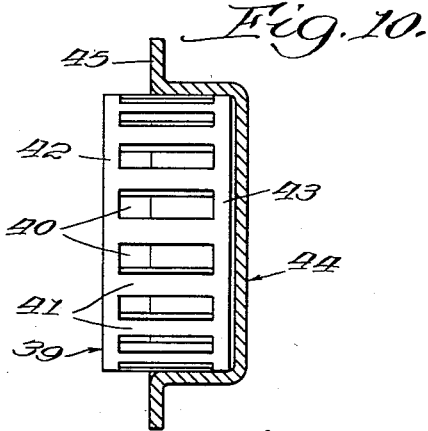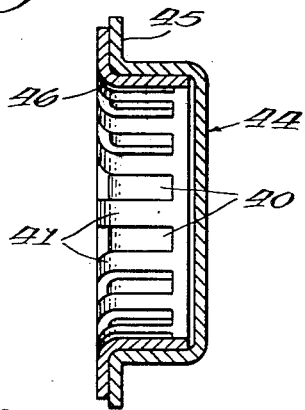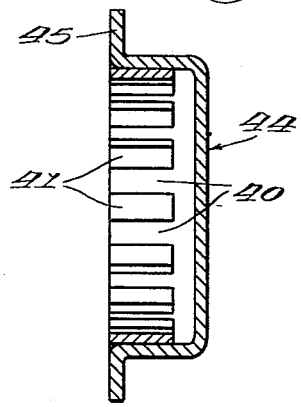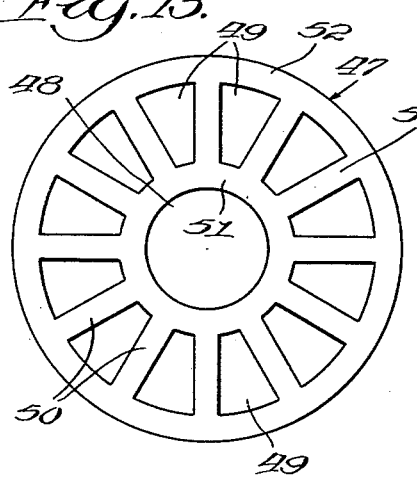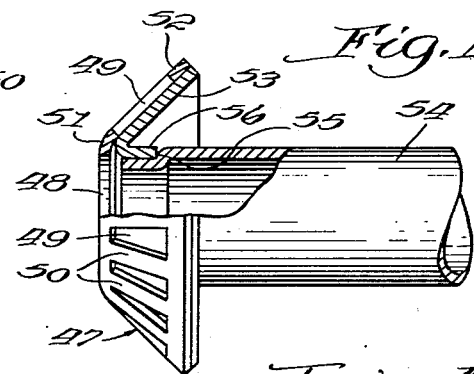

United States Patent Office 2,704,882
Patented Mar. 29, 1955

2,704,882

METHOD OF MAKING TOOTHED DEVICES

Raymond G. Olson, Niles, Ill., assignor of one-third to Kenneth T. Snow, Oak Park, Ill.

Application December 19, 1949, Serial No. 133,739

10 Claims. (Cl. 29—159.2)

This invention relates to a new and improved method of making toothed devices.

Gears, splines, and other toothed devices for interengagement with other such devices have been in existence in some form almost from the beginning of time. In the past years the accepted methods of making such gear devices have included forgings and castings which of necessity are extremely heavy and not very economical to produce.

The primary object of this invention is the method of fabricating gear devices from simple, economical stampings.

An important object of this invention is to provide a method of making toothed devices in which a piece of material is slotted to substantially define a tooth therebetween and thereafter fusing the slotted piece to a base with a resulting toothed device.

Another important object of this invention is the provision of steps of slotting various shaped members by stamping, forming the shaped members to engage base members, fusing the slotted members to the base members, thereafter optionally machining away portions of the slotted members as desired and shaping the material between slots as teeth.

Another and further important object of this invention is to provide a method of fabricating gears, splines, bevel gears, and internal and external toothed devices of all kinds by employing sheet metal stampings, forming the stampings, and thereafter fusing the formed stampings to base members.

A still further object of the invention is the provision of a method of cutting spaced apart slots in various shaped pieces of material such as tubular sleeves, flat rectangular sheets, circular flat sheets, thereafter forming the various shaped slotted pieces to predetermined shapes, temporarily fastening the slotted pieces to correspondingly shaped base members and then fusing the formed slotted pieces to the base whereupon the portions of the slotted pieces between the spaced apart slots constitute teeth.

Still another object of the invention is the method of making fabricated gears and splines by a pre-cutting of slots in a shell material to be later fused to a base.

Another and still further important object is the cutting of spaced parallel slots in a piece of material, forming the slotted piece of material to a base, temporarily fastening the slotted piece of material to the base by the retaining tie members formed at the ends of the slots, and fusing the entire piece of material to the base.

Another object is the fabrication of bevel gears by the cutting of spaced apart radially disposed slots in a circular disc leaving inner and outer concentric retainer rings and defining spaced parallel gear teeth between adjacent slots.

A further object is to provide a method of fabricating gears in which the several teeth are preliminarily held together in a fixed spaced apart positioning for final gear teeth alignment.

Other and further important objects of this invention will become apparent from the following specification and accompanying drawings.

In the drawings:

Figure 1 is a perspective view of a tubular sleeve of blank material.

Figure 2 is a perspective view of the sleeve of Figure 1 after cutting of parallel slots therein.

Figure 3 is a front elevational view of the slotted sleeve mounted on and fused to a cylindrical base.

Figure 4 is a front elevational view of the device as shown in Figure 3 after the machining away of undesired retaining portions.

Figure 5 is an end view of the splined shaft of Figure 4.

Figure 6 is another end view of the splined shaft of Figure 5 after final shaping of the spline teeth.

Figure 7 is a top plan view of a modified form of slotted rectangular blank of material.

Figure 8 is a perspective view of the slotted blank of Figure 7 formed over and fused to a cylindrical base.

Figure 9 is a perspective view of a short slotted sleeve preliminary to the making of an internal gear.

Figure 10 is a vertical elevational view partially in section showing the slotted sleeve of Figure 9 mounted within a flanged cylindrical base.

Figure 11 shows a view similar to Figure 10 with the slotted sleeve annularly flanged to overlie the base flange.

Figure 12 is another view similar to Figures 10 and 11 with the tooth retaining rings machined away.

Figure 13 is a top plan view of another modified form of the invention of a flat circular radially slotted piece of material.

Figure 14 is an elevational view of the side of a bevel gear fabricated by forming the slotted disc of Figure 13 over a cone shaped base.

As shown in the drawings:

The reference numeral 20 indicates generally an elongated tubular sleeve which constitutes the blank form of material used in the fabrication of a spline. As best shown in Figure 2 a plurality of circumferentially spaced parallel elongated slots 21 have been cut preferably by stamping in the tubular sleeve 20. The spaced slots define spline teeth 22 between each pair of adjacent slots 21. The spaced slot defined teeth 22 are parallel one to the other and continue around the outer circumference of the tubular sleeve 20. In addition to the spline teeth 22 the slots 21 further define end retaining rings 23 and 24. These retaining rings maintain a fixed spacing of the spline teeth and insure that the teeth will be in proper alignment for interengagement with other toothed devices after the slotted elongated sleeve has been mounted on a suitable shaft member.

The next step in the fabrication of a splined member is the application of the slotted sleeve to a shaft 25 such as shown in Figure 3. The sleeve 20 is preferably designed with a relatively snug fit over the shaft 25 so that no means is necessary to hold it in place while the entire assembly is subjected to an attaching process such as fusing or welding and including such processes as the hydrogen braze which has proven to be so successful in the bonding of one metal to another. It should be understood that any form of fusing or brazing may be used and that the hydrogen braze is just one of these forms. Another acceptable braze is the now commercially suitable induction braze in which materials are subjected to induced heats within a reducing atmosphere. Hereafter whenever the word "fusing" is used in this specification it signifies any mode of fastening such as brazing, welding, fusing, soldering, etc. After fusing or brazing is complete the tubular slotted sleeve member 20 is integral with the shaft or cylindrical base member 25. Without further steps the device as shown in Figure 3 after fusing may be used as a gear or spline device. However, in order to enable gear or toothed devices to slidably engage the spline shaft as shown in Figure 3 it is necessary to remove the end retaining rings 23 and 24. The retaining rings maintain the teeth in properly spaced apart position throughout all the spline fabrication and up to the time of brazing. As shown in Figure 4 the end retaining rings 23 and 24 have been removed and the splined shaft 25 is now ready for operation. Figure 5 shows an end view of the device of Figure 4 and emphasizes the fact that the teeth 22 are formed merely by the stamping or cutting of slots in a regularly shaped tubular sleeve and thus the teeth do not have the profile necessary for easy interlocking and sliding with a cooperative spline or gear member. It is therefore desirable that the teeth 22 be shaped by a broaching tool or the like to supply the teeth with the beveled outer surface as shown at 26 in Figure 6. The splined shaft is now fully completed and comparable in every respect to the much more complex splined shaft made from a forging.

As best shown in Figure 7 another way of making a splined shaft with the same end result as shown in Figure 6 is to supply a rectangularly shaped sheet of flat material as shown at 27 and thereafter stamping slots in the flat piece of material in a spaced apart parallel fashion as shown at 28. The slots 28 are regularly spaced throughout the length of the rectangle 27 and define teeth 29 between each adjacent pair of slots. The slotted sleeve as shown in Figure 2 is thus very similar to the slotted rectangular piece of material as shown in Figure 7 inasmuch as the slots are parallel and define parallel teeth in the same manner. The teeth 29 of the device of Figure 7 are not separate loose teeth, but are held together by retaining tie members 30 and 31 similar in every respect to the annular tie members 23 and 24 of the device of Figures 2 and 3.

The next step in the process of making a splined device from the rectangular slotted member 27 is to roll the rectangular sheet into the tubular sleeve as shown in Figure 8. This of course corresponds to the tubular sleeve of Figure 2. In order to have the slots and teeth held parallel to each other there is provided indexing projections 32 and 33 on one end of the rectangular 27 and on the opposite end there is provided projection receiving sockets 34 and 35 spaced apart in the same manner as the projections 32 and 33.

As shown in Figure 8 the projections 32 and 33 interlock in the sockets 34 and 35 respectively and provide an ideal location for tack welding or otherwise fastening the sheet member 27 to the base member 36. The tack welds 37 and 38 simultaneously act to hold the ends of the rectangular member 27 in the form of a tubular sleeve and hold the formed sleeve to the shaft 36 during the fusing of the entire sleeve to the shaft. In other words the tack welds 37 and 38 are a means of temporarily holding the slotted sleeve member to the shaft during the fusing of the sleeve to the base member. Only two such tack welds have been shown, but it is contemplated that any number of these welds suitably spaced may be employed just so the sleeves are properly held in position on a base during the fusing process. It will of course be understood that the subsequent steps of machining the end retaining members 30 and 31 which are now ring members and correspond even more closely to the end rings 23 and 24 of the device as shown in Figure 3 may be optionally performed. The teeth 29 may also be shaped with the profile as shown in Figure 6.

It should be obvious that the making of splines, gears, or any toothed devices may be fabricated in the same manner as shown for the splines or gears of Figure 1 to 8 inclusive. As shown in Figure 9 a short tubular sleeve corresponds quite similarly to the elongated tubular sleeve of Figure 2. The sleeve 39 is provided with circumferentially spaced parallel slots 40 which define gear teeth intermediate each pair of slots. The gear teeth are designated by the numeral 41. At the ends of the slots the annular retaining rings 42 and 43 complete the short sleeve 39. In addition to being shorter than the sleeve of Figures 1 and 2 the sleeve 39 is generally of a larger diameter and is used in the manufacture of a gear. It could be fabricated into a spur gear or the like in the same manner as the fabrication of the splines as shown in the prior figures. However, for the purpose of showing the ready adaptability of the method of this invention to the manufacture of all kinds of gears the present tubular sleeve 39 slotted as shown at 40 is inserted into a cup-like base member 44 having an annular outwardly extending flange 45. The end result of the insertion of the slotted sleeve into this cup-like member 44 is to obtain an internal annular ring gear. The sleeve is provided with a snug fit within the cup base 44 in the same manner as the tubular sleeve 20 is provided with a snug fit over the cylindrical shaft as shown in Figure 3. The snug fit is a form of temporary holding or fastening of the sleeve to the base. The defined teeth 41 are thus equally spaced around the full annular inner surface of the cup member 44. The entire assembly is now fused in the same manner as the fusing of the sleeve 20 to the shaft 25 and resulting in an integral internal gear teeth with the cup-base 44. The end retaining rings 42 and 43 can now immediately be removed by a cutting away, machining or otherwise and resulting in an internal annular gear as shown in Figure 12 wherein only the teeth 41 remain. As in the case of the splines of Figure 5 the final shape of the teeth 41 may be obtained by applying a broaching tool for gaining a proper tooth profile. There is an alternative form of completing the fabrication of the device as shown in Figure 10 and that is shown in Figure 11. Here the annular retaining ring 42 is removed by being bent outwardly along the annular line 46 so that the retaining ring lies parallel to and abutting the annular flange 45 of the cup-like base member 44. Inasmuch as the slots 40 extend outwardly beyond the depth of the cup 44 the teeth 41 defined by the slots extend completely to the surface of the cup upon the outward bending or flanging of the retainer ring 42 and thus if desired no further machining is necessary and the gear may be used as shown in Figure 11. Still another method of completing the internal annular ring gear of Figure 12 from the condition as shown in Figure 10 immediately after the insertion of the sleeve 39 therein. Prior to fusing the flange 42 may be outwardly bent as shown in Figure 11 along the annular bend line 46 to hold the sleeve in temporary fixed position with respect to the cup 44 to enable easy and ready fusing of the sleeve to the cup base without fear of relative shifting movement of these two elements. Thereafter the retaining ring portions may be cut away or left as desired. For some installations it may be desirable to only remove one of the end retaining rings. In some instances the retaining rings might be considered undesirable and possibly limiting the function of the gear or spline and therefore these undesired portions are machined away as necessary to the proper functioning of the toothed device.

Figure 13 shows still another form of gear fabrication. A disc 47 of circular form is provided with a central opening 48 and a plurality of radially disposed slots 49 which are wedge shape for the purpose of defining parallel teeth 50 between every two adjacent slots. The slots 49 further define inner and outer concentric retainer rings 51 and 52 similar to the retaining rings 23 and 24 of the sleeve of Figure 2 and/or the end retaining members 30 and 31 of the rectangular member 27 as shown in Figure 7. The retaining rings 51 and 52 retain the teeth member 50 in regularly spaced position around the full annular path of the disc 47. As shown in Figure 14 the disc 47 has been formed in the shape of a cone and mounted onto a conical shaped stamped base 53 having a tubular shaft 54 extending rearwardly from the back side thereof. The tubular shaft 54 has a shoulder 55 for the reception of an annular flange 56 of the conical base stamping. The conical sleeve formed from the disc member 47 is temporarily held in position on the base 53 by tack welds or otherwise during the fusing or brazing of the sleeve to the base. The fusing step in this bevel gear fabrication integrally joins the shaft, base and tooth sleeve. In the same manner as the manufacture of the splines and gears heretofore described the teeth 50 are now disposed around the cone base 53 and are integral therewith and thus constitute a bevel gear capable of cooperating with another bevel gear for the transmission of rotatable drive at some angle other than a straight angle. Here again it is preferable that the end retaining rings 51 and 52, which are so called after the device has been shaped in the form of a cone sleeve, be machined away in the manner of the machining away of the end rings as shown in Figure 4. Similarly the shape of the bevel gear teeth may be completed by a shaping or other tool to obtain the necessary profile for the convenient and proper interengagement with other toothed devices.

It will be understood that herein is provided a suitable means of fabricating a gear or spline for any toothed device whether it be internal or external and not limited in any respect to size or shape. Further with the present method of gear fabrication it is possible to make the teeth of one material and the base of another material. This means that the teeth may be a hardened alloy steel and the base merely cold rolled stock for a resultant economical gear.

Numerous details of construction and the method of fabrication of these toothed devices may be changed without departing from the principles disclosed herein and I therefore do not propose limiting the patent granted hereon otherwise than as necessitated by the appended claims.

What is claimed is:

1. A method of making toothed devices comprising the steps of supplying a piece of material, cutting a plurality of slots in said piece of material substantially defining teeth between adjacent slots and retaining strips at the ends thereof, applying said slotted piece of material to a base member, temporarily holding said slotted piece of material to said base member, fusing the entire under surface of said slotted piece of material to said base member whereby the defined teeth are integral with the base member, machining away the retaining strips at the ends of the slotted piece of material which were necessary to hold the original tooth alignment, and finally shaping said teeth for interengagement with other toothed devices.

2. A method of making toothed devices comprising the steps of supplying a piece of tubular material, cutting spaced apart parallel slots around the circumference of said piece of tubular material defining teeth extending lengthwise of said tubular piece of material and end retaining rings joining all of the teeth together, mounting the slotted tubular piece of material on a cylindrical element, fusing the entire inner surface of said slotted tubular piece of material to the outer surface of said cylindrical element, and cutting away the end retaining rings of the slotted tubular piece of material to effect an operable toothed element.

3. A method of making a spline comprising the steps of supplying a cylindrical sleeve of material, cutting spaced parallel elongated slots axially of the cylindrical sleeve and around the circumference thereof substantially defining spline teeth between adjacent elongated slots and end retaining rings at both ends thereof, mounting said slotted cylindrical sleeve on a cylindrical base, fusing the entire inner surface of said slotted sleeve to the outer surface of said base, machining away the end retaining rings preliminarily used to maintain uniform tooth spacing, and finally shaping the spline teeth.

4. A method of making toothed devices comprising the steps of supplying a substantially rectangular piece of material, cutting substantially parallel spaced apart slots in said piece of material defining spaced apart teeth, forming said slotted rectangular piece of material into a tubular member with the slots and their intermediate teeth extending longitudinally thereof and the ends of said tubular member having retaining rings defined by said slots and maintaining said teeth in fixed spaced apart position, placing said tubular member on a cylindrical base, tack welding the retaining rings to the base, fusing the entire inner surface of said tubular member to the exterior surface of said base, machining away the retaining rings used initially to maintain the teeth uniformly spaced, and shaping the teeth for the purpose of meshing with other toothed devices.

5. A method of making toothed devices comprising the steps of supplying a piece of material, cutting a plurality of slots in said piece of material substantially defining teeth between adjacent slots and retaining strips at the ends thereof, applying said slotted piece of material to a base member, fusing the entire under surface of said slotted piece of material to said base member whereby the defined teeth are integral with the base member, machining away the retaining strips at the ends of the slotted piece of material which were necessary to hold the original tooth alignment, and finally shaping said teeth for interengagement with other toothed devices.

6. A method of making toothed devices comprising the steps of supplying a piece of material, cutting a plurality of slots in said piece of material substantially defining teeth between adjacent slots and retaining strips at the ends thereof, applying said slotted piece of material to a base member, fusing the under surface of the teeth portions of said slotted piece of material to said base member whereby the defined teeth are integral with the base member, and removing at least one of the retaining strips at the ends of the slotted piece of material which were necessary to hold the original teeth alignment.

7. A method of making a gear comprising the steps of supplying a piece of material, cutting a plurality of spaced apart slots in said piece of material, said slots substantially defining gear teeth therebetween and retaining tie members at the ends thereof, forming said slotted piece of material in the shape of a cylindrical sleeve having retaining tie rings at the ends thereof, mounting said cylindrical sleeve on a ring member cylindrical base, temporarily fastening said cylindrical sleeve within said cylindrical base, fusing the under surface of the defined gear teeth of said slotted piece of material to said ring member cylindrical base whereby the defined gear teeth are integral with the ring member cylindrical base, and removing at least one of the retaining tie rings of one end of the cylindrical sleeve which were necessary to hold the original teeth alignment.

8. A method as set forth in claim 7 in which final steps of machining away undesired portions of the retaining rings and shaping the gear teeth are added.

9. A method of making a bevel gear comprising the steps of supplying a circular disc of material, cutting radial spaced apart slots in said circular disc of material substantially defining parallel gear teeth between adjacent slots and leaving concentric retaining rings at the inner and outer ends of said slots, supplying a conical base, forming said slotted circular disc into a cone shape, temporarily fastening said slotted cone to said conical base, fusing the under surface of the defined parallel gear teeth of said slotted piece of material to said conical base whereby the defined gear teeth are integral with the conical base, and removing at least one of the retaining rings.

10. A method as set forth in claim 9 in which the additional steps of machining away the retaining rings and shaping the teeth as gear teeth are performed.

References Cited in the file of this patent

UNITED STATES PATENTS

| | | |
|---|---|---|
| 432,691 | Burdon | July 22, 1890 |
| 840,977 | Warner | Jan. 8, 1907 |
| 1,233,688 | Murray | July 17, 1917 |
| 1,446,487 | Timken | Feb. 27, 1923 |
| 1,508,800 | Mattice | Sept. 16, 1924 |
| 1,597,429 | Brincil | Aug. 24, 1926 |
| 1,718,721 | Weeks | June 25, 1929 |
| 1,743,943 | Wagner | Jan. 14, 1930 |
| 1,804,837 | Lunn | May 12, 1931 |
| 1,819,272 | Short | Aug. 18, 1931 |
| 2,346,906 | Cheney | Apr. 18, 1944 |

FOREIGN PATENTS

| | | |
|---|---|---|
| 77,924 | Austria | Aug. 25, 1919 |